(12) United States Patent
Burky et al.

(10) Patent No.: US 11,204,773 B2
(45) Date of Patent: Dec. 21, 2021

(54) STORING A PROCESSING STATE BASED ON CONFIDENCE IN A PREDICTED BRANCH OUTCOME AND A NUMBER OF RECENT STATE CHANGES

(71) Applicant: Arm Limited, Cambridge (GB)

(72) Inventors: William Elton Burky, Austin, TX (US); Glen Andrew Harris, Austin, TX (US); Yasuo Ishii, Austin, TX (US)

(73) Assignee: Arm Limited, Cambridge (GB)

( * ) Notice: Subject to any disclaimer, the term of this patent is extended or adjusted under 35 U.S.C. 154(b) by 213 days.

(21) Appl. No.: 16/124,247

(22) Filed: Sep. 7, 2018

(65) Prior Publication Data

US 2020/0081719 A1 Mar. 12, 2020

(51) Int. Cl.
*G06F 9/38* (2018.01)

(52) U.S. Cl.
CPC .................. *G06F 9/3863* (2013.01)

(58) Field of Classification Search
CPC .............................. G06F 9/3861; G06F 9/3863
See application file for complete search history.

(56) References Cited

U.S. PATENT DOCUMENTS

| 5,675,759 | A  | * | 10/1997 | Shebanow | G06F 9/384 |
| | | | | | 712/216 |
| 5,961,636 | A  | * | 10/1999 | Brooks | G06F 9/3863 |
| | | | | | 712/222 |
| 7,069,411 | B1 | * | 6/2006  | McMinn | G06F 9/3836 |
| | | | | | 711/202 |
| 8,918,625 | B1 |   | 12/2014 | O'Bleness | |
| 9,262,170 | B2 | * | 2/2016  | Krishna | G06F 9/3863 |
| 2005/0120191 | A1 | * | 6/2005  | Akkary | G06F 9/3836 |
| | | | | | 712/217 |
| 2006/0161740 | A1 |   | 7/2006  | Kottapalli | |
| 2008/0148026 | A1 | * | 6/2008  | Dhodapkar | G06F 9/3806 |
| | | | | | 712/228 |
| 2010/0031084 | A1 | * | 2/2010  | Tremblay | G06F 9/30043 |
| | | | | | 714/13 |
| 2011/0238962 | A1 |   | 9/2011  | Cain, III | |
| 2011/0264862 | A1 |   | 10/2011 | Karlsson | |
| 2014/0025928 | A1 |   | 1/2014  | Bradbury | |
| 2014/0281427 | A1 | * | 9/2014  | Abdallah | G06F 9/3838 |
| | | | | | 712/225 |
| 2017/0185410 | A1 |   | 6/2017  | Abernathy | |
| 2018/0300150 | A1 | * | 10/2018 | Gschwind | G06F 9/3863 |

OTHER PUBLICATIONS

Carmean, "The Intel Pentium 4 Processor", 2002, 39 pages.*
U.S. Appl. No. 16/445,641, filed Jun. 19, 2019, Burky.
Notice of Allowance dated Dec. 14, 2020 for U.S. Appl. No. 16/445,641, 9 pages.
Office Action dated Aug. 20, 2020 for U.S. Appl. No. 16/445,641, 16 pages.

* cited by examiner

*Primary Examiner* — David J. Huisman
(74) *Attorney, Agent, or Firm* — Nixon & Vanderhye P.C.

(57) ABSTRACT

A data processing apparatus is provided. It includes processing circuitry for speculatively executing a plurality of instructions. Storage circuitry stores a current state of the processing circuitry and a plurality of previous states of the processing circuitry. Execution of the plurality of instructions changes the current state of the processing circuitry. Flush circuitry replaces, in response to a miss-prediction, the current state of the processing circuitry with a replacement one of the plurality of previous states of the processing circuitry.

9 Claims, 6 Drawing Sheets

STORING A PROCESSING STATE BASED ON CONFIDENCE IN A PREDICTED BRANCH OUTCOME AND A NUMBER OF RECENT STATE CHANGES

TECHNICAL FIELD

The present disclosure relates to data storage. More particularly, it relates to caches.

DESCRIPTION

Speculative execution is a technique that makes it possible for instructions to continue executing before the result of a control flow instruction is known. In particular, prediction circuitry is used to predict the result of the control flow instruction before it is known. Instructions at the predicted target of the control flow instruction then continue to be executed until such time as the result is known. If the result matches the prediction then the process can continue. Otherwise, the process must be "rewound" and the executed instructions must be "undone". Although a net benefit is provided, since without speculation, execution must always stall until such time as the result of the control flow instruction is known, the cost of rewinding can be high. It would be desirable if this cost can be reduced.

SUMMARY

According to one aspect there is provided a data processing apparatus comprising: processing circuitry to speculatively execute a plurality of instructions; storage circuitry to store a current state of the processing circuitry and a plurality of previous states of the processing circuitry, wherein execution of the plurality of instructions changes the current state of the processing circuitry; and flush circuitry to replace, in response to a miss-prediction, the current state of the processing circuitry with a replacement one of the plurality of previous states of the processing circuitry.

According to another aspect, there is provided a method comprising: speculatively executing a plurality of instructions on processor circuitry; storing a current state of the processing circuitry and a plurality of previous states of the processing circuitry, wherein execution of the plurality of instructions changes the current state of the processing circuitry; and replacing, in response to a miss-prediction, the current state of the processing circuitry with a replacement one of the plurality of previous states of the processing circuitry.

According to another aspect, there is provided a data processing apparatus comprising: means for speculatively executing a plurality of instructions; means for storing a current state of the means for speculatively executing a plurality of instructions and a plurality of previous states of the means for speculatively executing a plurality of instructions, wherein execution of the plurality of instructions changes the current state of the means for speculatively executing a plurality of instructions; and means for replacing, in response to a miss-prediction, the current state of the means for speculatively executing a plurality of instructions with a replacement one of the plurality of previous states of the means for speculatively executing a plurality of instructions.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In accordance with one aspect there is provided a data processing apparatus comprising: processing circuitry to speculatively execute a plurality of instructions; storage circuitry to store a current state of the processing circuitry and a plurality of previous states of the processing circuitry, wherein execution of the plurality of instructions changes the current state of the processing circuitry; and flush circuitry to replace, in response to a miss-prediction, the current state of the processing circuitry with a replacement one of the plurality of previous states of the processing circuitry.

In accordance with the above, the processing circuitry speculatively executes the plurality of instructions. Pipelining is a technique in which the steps of instruction fetching, decoding an executing are separated out so that one instruction can be fetched, while another is decoded, while another is executed. During execution, the flow of control may be affected by one or more control flow instructions such as branch instructions. However, until the branch instruction is executed, it is not known which set of instructions to begin fetching, decoding and executing. Accordingly, a prediction is made as to which way the branch instruction will go. Instructions following the predicted direction are then "speculatively" executed until it is known what the actual outcome of the preceding branch instruction is. At that time, if the prediction was correct, then execution can continue and no delay has occurred. Alternatively, if the prediction was incorrect, a "rewind" or "flush" occurs, and execution returns to the point of the branch instruction, this time following the correct path. The process of speculatively executing instructions therefore involves saving a current state of the processing circuitry and, in response to a flush, restoring this state in the future. The state relates to values stored in registers that are used to perform calculations during the execution of the instructions. In the above aspect, a plurality of previous states of the processing circuitry is kept. In this way, it is possible to reduce the extent to which a large rewind must occur, hence reducing the processing resources required when a rewind must occur.

In some embodiments, a state of the processing circuitry comprises at least one reference to a result of one of the plurality of instructions that remains uncommitted. During the execution of instructions, data values are stored in storage circuitry such as registers. Until such time as the output of these instructions is committed (e.g. until it is known whether any preceding branch instructions were correctly followed) the result of these instructions that have been speculatively executed may continue to affect the current state of the processing circuitry. Accordingly, the state of the processing circuitry that is saved comprises references to these results.

In some embodiments, the data processing apparatus comprises snapshot generation circuitry to perform a determination as to whether the current state of the processing circuitry is to be stored in the storage circuitry. The snapshot generation circuitry determines when the current state of the processing circuitry is to be saved (i.e. stored) in the storage circuitry. Accordingly, the snapshot generation circuitry determines whether the conditions are met in order for the current state of the processing circuitry to be restored. The conditions can be specified such that the probability of having to perform a large rewind or a large restoration of state is reduced as compared to a situation when only a single snapshot is kept.

In some embodiments, the determination comprises a requirement that a current instruction is a branch instruction. As previously discussed, speculative execution occurs as a consequence of, for example, branch instructions. Branch instructions therefore mark points at which miss-speculation could occur, and such points are appropriate points for snapshots to be generated.

In some embodiments, the determination comprises a requirement that n branch instructions have been encountered since a most recent previous storage of the current state of the processing circuitry. Since the generation of a snapshot may necessitate the use of storage and since the state of the processing circuitry may be large, a large amount of circuitry may be necessitated for the storage of each previous processing circuitry state. Consequently, it may not be appropriate to store state for each and every branch instruction. Therefore, in these embodiments, a snapshot is only generated every n branch instructions. The value n is an integer greater than 1.

In some embodiments, the determination comprises a requirement based on a number of state changes that have been made since a most recent previous storage of the current state of the processing circuitry. State changes arise as a consequence of instructions being executed that cause values in storage circuitry to be changed (e.g. the changing of values and registers). For instance, the execution of each instruction may cause program counter values and stack pointer values to change. In addition, the execution of instructions may cause data values to be output to particular registers. All of these changes can be considered to be state changes that are applied to the processing circuitry. In order to reduce the amount of rewind that must occur during miss-speculation, it is appropriate to try and reduce the number of state changes that must be undone. Consequently, in these embodiments the generation of a snapshot is based on a number of state changes since the generation of the previous snapshot. For instance, the requirement may be that the number of state changes that have been made since the most recent previous snapshot has been generated reaches some predetermined value.

In some embodiments, the data processing apparatus comprises: branch prediction circuitry to predict an outcome of the current instruction with a confidence indicator; and the number of state changes is dependent on the confidence indicator. As previously described, branch prediction circuitry may be used in order to predict the outcome of a particular branch instruction. This could, for instance, come about as a consequence of previous historical outcomes of the same branch. Consequently, the branch prediction circuitry may not simply predict an outcome, but also produce a confidence indicator providing an indication of the confidence with which the prediction is associated. In these embodiments, the number of state changes that is required in order to generate a snapshot is dependent on the confidence indicator reflecting the fact that the number of snapshots that are desired may be dependent on the confidence with which branches have been taken.

In some embodiments, the number of state changes is a lower value when the confidence indicator indicates a lower value; and the number of state changes is a higher value when the confidence indicator indicates a higher value. As the confidence indicator indicates a lower value (e.g. that there is a lower confidence that the branch should or should not be taken), the number of state changes is lower providing more encouragement to produce snapshots. Similarly, when the confidence value is higher—indicating a higher confidence that a branch will or will not be taken, the number of state changes is higher providing lower encouragement to produce snapshots. This represents the fact that when there is a high confidence regarding the prediction of a branch, it is unlikely that miss-speculation will occur. Consequently, the system may be more tolerant of the number of state changes that can be made in order to reduce the number of snapshot that need be generated. In particular, gaps between the generation of snapshots can be reduced if it is considered to be unlikely that each of those snapshots is to be needed.

In some embodiments, the data processing apparatus comprises: invalidation circuitry to invalidate a flushed one of the plurality of previous states of the processing circuitry and to invalidate a completed one of the plurality of previous states. One of the circumstances in which the invalidation circuitry will invalidate a previous state is when that previous state has been flushed. In this situation, when it is determined that the control flow was predicted incorrectly and that a "rewind" must occur, any state associated with that incorrectly followed control flow can be invalidated (e.g. removed) thereby making way for future states to be saved. Similarly, when a state has been completed—e.g. when it is determined that a particular direction at a branch instruction was correctly predicted, then it can be assumed that the state is no longer necessary since a rewind past that point will no longer occur. Consequently, the state associated with a completed or a flushed state can be invalidated (e.g. removed) thereby making way for other states to be stored in the future.

In some embodiments, each of the previous states of the processing circuitry is associated with an age indicator to indicate its age relative to other previous states of the processing circuitry. Since it is possible that different states are invalidated at different times, it cannot necessarily be assumed that the ordering of the states corresponds with their age. Accordingly, an age indicator can be provided in order to determine how each state is aged relative to the other states. This makes it possible to select the most appropriate of the various states to rewind to when a rewind must occur.

In some embodiments, the flush circuitry is adapted to select the replacement one of the plurality of previous states of the processing circuitry as a youngest one of the plurality of previous states occurring on or before the one of the plurality of instructions associated with the miss-prediction in the plurality of instructions. In particular, the state may be selected such that it is older than the instruction at which this speculation occurred but is the youngest such state. This causes the rewind to occur past the point of miss-speculation but to go as little past that point of miss-speculation as possible such that the amount of rewinding to be done can be kept low.

In some embodiments, the plurality of previous states of the processing circuitry comprises 5 previous states of the processing circuitry.

Particular embodiments will now be described with reference to the figures.

Figure 1:
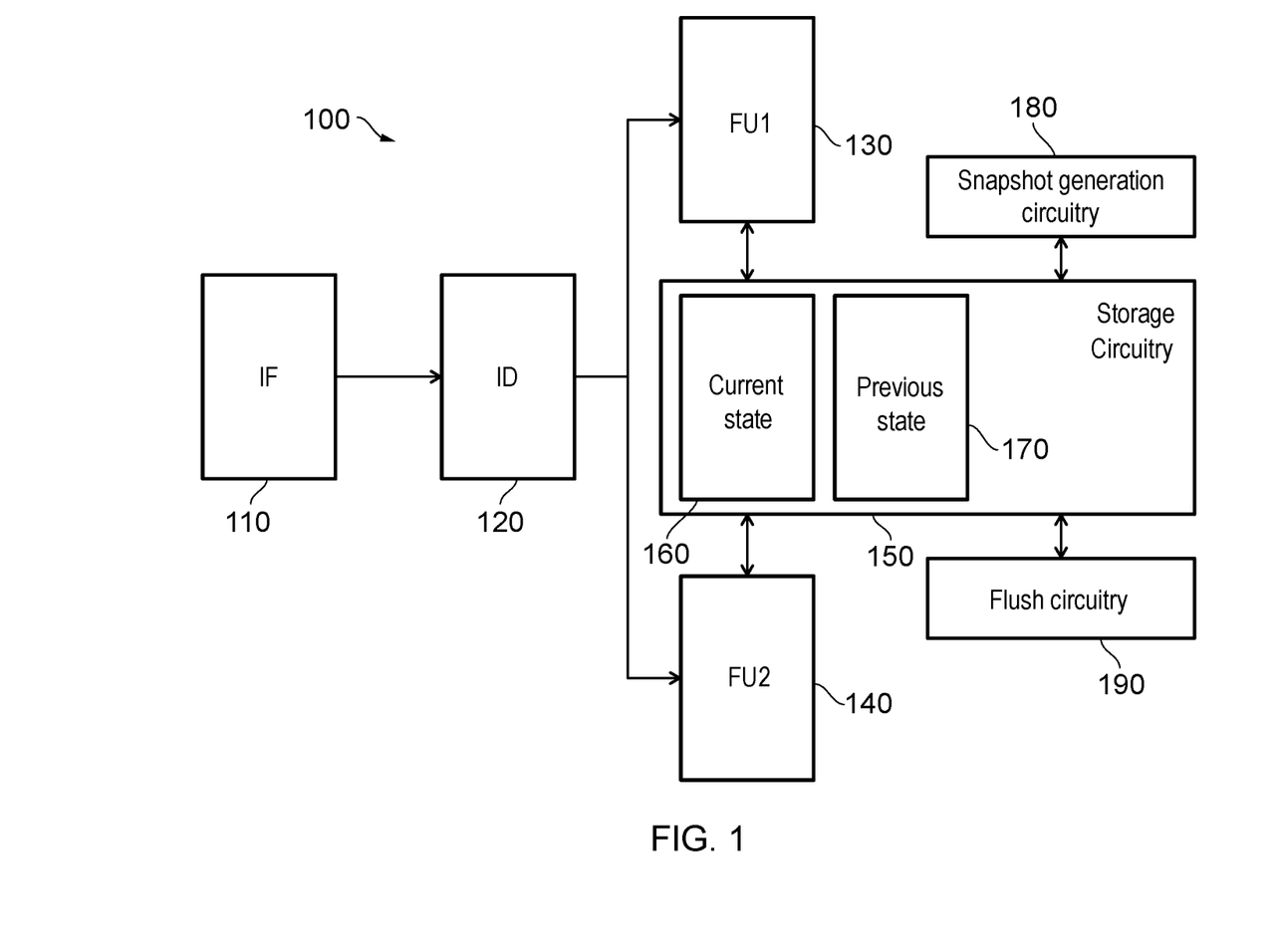
FIG. 1 schematically illustrates a data processing apparatus 100 in accordance with some embodiments.

FIG. 1 schematically illustrates a data processing apparatus 100 in accordance with some embodiments. The apparatus 100 includes instruction fetch circuitry (IF) 110 that fetches instructions to be executed. Having fetched the instructions, the instruction decoder (ID) 120 decodes each instruction and produces one or more control signals that are passed to functional units (FU1) 130, (FU2) 140. The functional units 130, 140 are responsible for performing one or more micro-operations that are dictated by the instruction decode circuitry 120. For instance, one of the functional units 130 may be responsible for performing arithmetic operations. Another functional unit 140 may be responsible for controlling program flow in response to branch instructions. As will be known to the skilled person, in general the data processing apparatus 100 comprises a pipeline such that as the instruction fetch circuitry 110 is fetching an instruction, another instruction may be decoded by the decode circuitry 120 and another instruction could be executed by each of the functional units 130, 140. Furthermore, in some systems, the instructions may be executed out of order in order to increase utilisation of the different circuits within a data processing apparatus 100.

When a control flow instruction such as a branch instruction is encountered, it is desirable to continue operation of the different units in the data processing apparatus 100. However, until the branch instruction is executed, it is not known which direction program flow should proceed. The present apparatus 100 therefore predicts which direction to go in. Snapshot generation circuitry 180 performs a snapshot of a current state 160 of the data processing apparatus 100, which is stored in storage circuitry 150. As shown in FIG. 1, the storage circuitry 150 contains not only a current state 160 but also a previous state 170 from which a "rewind" can occur. Flush circuitry 190 is provided in order to enact this "rewind". Accordingly, if the prediction turns out to be incorrect, the state of the data processing apparatus 100 from the time of the branch can be restored.

Figure 2:
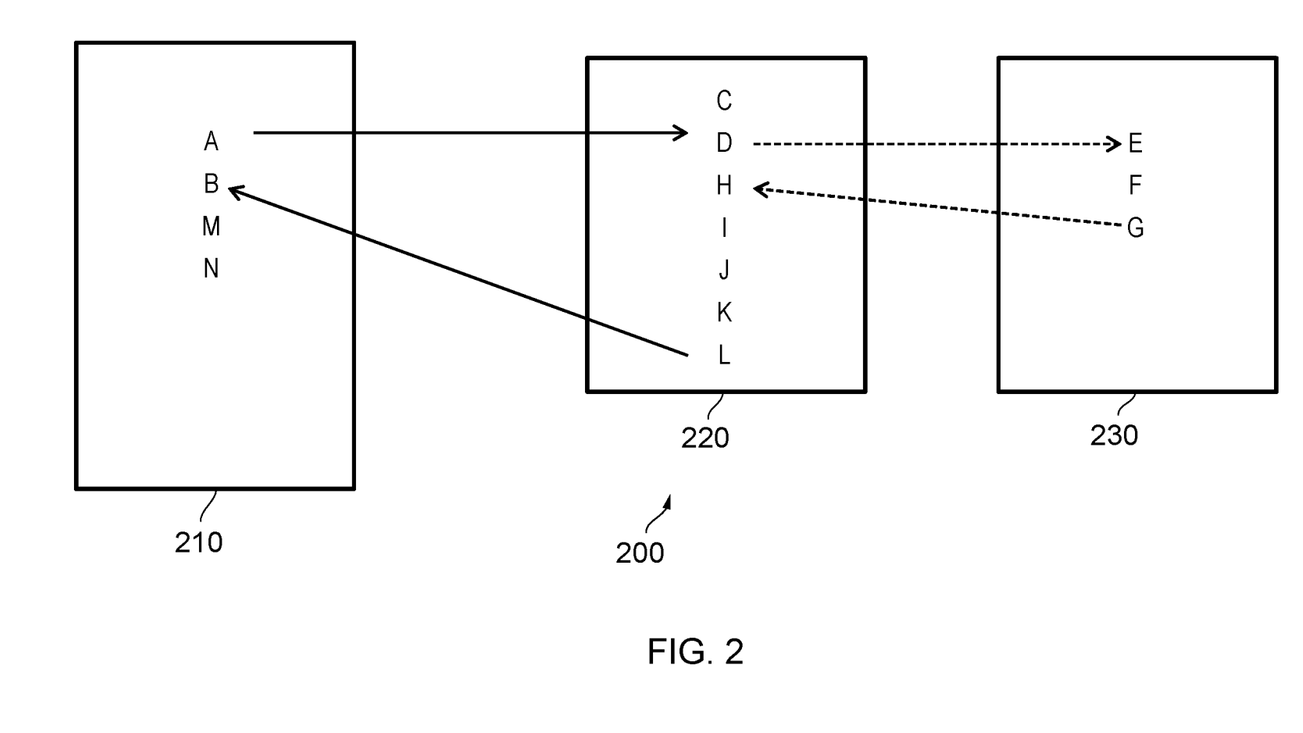
FIG. 2 illustrates the processing of speculative execution in accordance with some embodiments.

FIG. 2 illustrates the process of speculative execution. The program 200 is provided as three blocks 210, 220, 230. Each of the blocks 210, 220, 230 comprises a number of instructions. The program moves between the blocks 210, 220, 230 by one or more control flow instructions within the blocks 210, 220, 230. For instance, the program starts at instruction A. Instruction A is a branch instruction that causes the program to branch to an instruction D of a second block 220. The branch is conditional meaning that the branch will only occur if a particular condition is met. Therefore, if the condition is not met, then the program will instead proceed to instruction B in the first block 210. In this example, the solid line from instruction A to instruction D indicates that the condition is met and that the branch is followed. Instruction C is not executed in this example, because branch instruction A causes it to be omitted. Instruction D is also a conditional branch instruction. In this case, the conditional branch instruction causes the program flow to jump from instruction D in the second block 220 to instruction E in the third block 230. Theoretically, if this branch were to be followed, then instruction E would be executed followed by instruction F, and instruction G, which cause the control flow to return to the next instruction after the instruction that caused the branch (instruction H in the second block 220). In this example, the dashed line from instruction D indicates that the branch is not followed (e.g. the condition for the branch is not met). Accordingly, the program flow moves directly from instruction D to instruction H, through to instruction L where a return instruction for the second block 220 occurs. This causes a return to the instruction after the instruction that caused a branch to the second block 220, i.e. instruction B. The program then continues with instruction B, instruction M and finally instruction N.

As will be appreciated, mere analysis of the instruction will not indicate whether a particular branch is to be carried out or not. For instance, there is no indication ahead of time that instruction A will have its condition met or that instruction D will not have its condition met. However, it is desirable that instructions continue to be executed while it is determined whether or not the condition at instruction D is met, which itself dictates which instruction should execute next. Prediction circuitry can be provided in order to predict whether the branch will be followed or not. In this case, it may be predicted that the branch at instruction D will not be followed (e.g. perhaps from previous execution history of instruction D). Consequently, instructions H through L will continue to be executed while the branch condition at instruction D is evaluated. If it turns out that this prediction is correct, then the pipeline has been able to continue operating on instructions while the condition at instruction D is evaluated. Accordingly, the overall efficiency of the apparatus is maintained. However, if it is determined that the prediction was incorrect, then a "rewind" or "flush" is performed in order to return execution back to the branch instruction that was incorrectly predicted. Having performed the rewind, the program then continues in the correct direction. For instance, if an incorrect prediction occurred that instruction D would be followed then execution would begin on instructions E, F, and G. During that time, if/when it is determined that the prediction was incorrect, the rewind will cause execution to restart from instruction D, resulting in instruction H being executed next.

During the "rewind" it is necessary to restore the state of the data processing apparatus that was present at the time of instruction D. This can be achieved by using a snapshot that was taken at instruction D or by using a snapshot that was present before instruction D and continuing to apply any changes that were made up until the point of instruction D. This causes any state changes that occurred as a result of incorrectly performed instructions to be undone.

Figure 3:
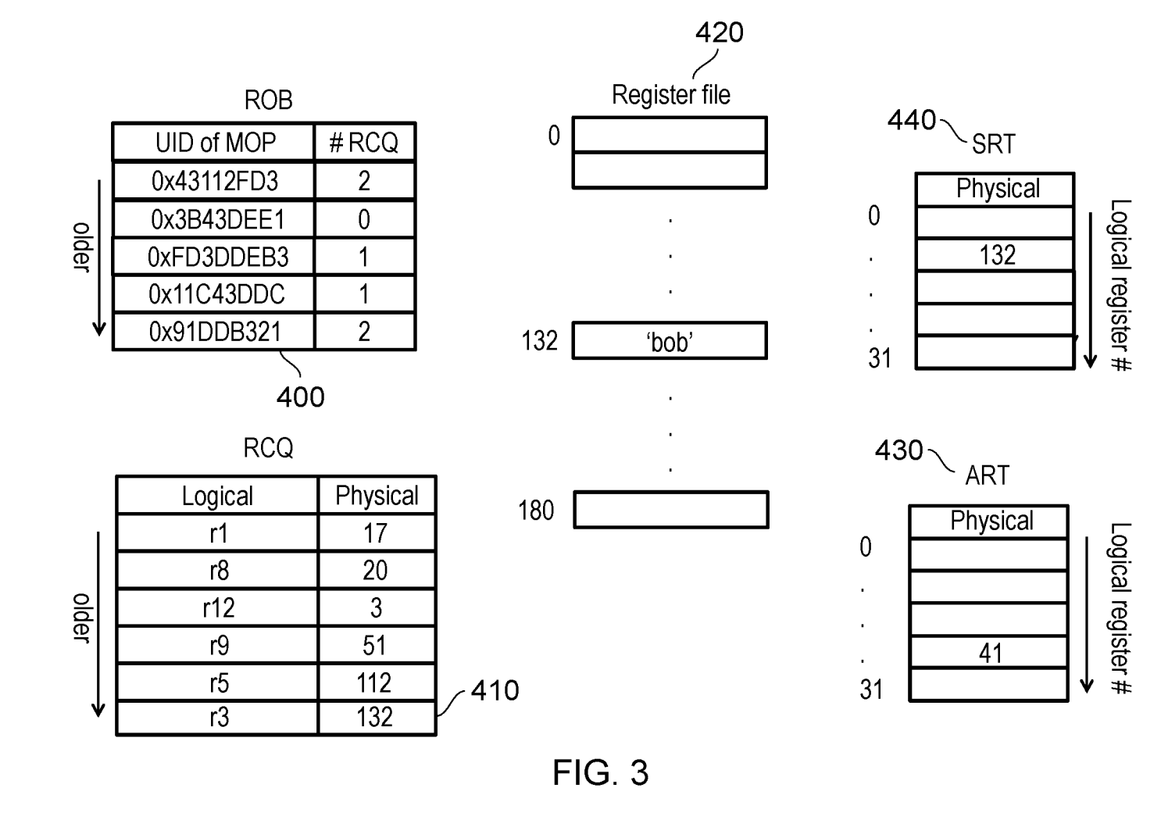
FIG. 3 illustrates how the state may be represented in storage circuitry in accordance with some embodiments.

FIG. 3 illustrates how the state may be represented in storage circuitry 150 in accordance with some embodiments. A Reorder Buffer (ROB) 400 stores the sequence of Micro-Operations (MOPs) that have been generated by the decode circuitry 120 and provided to one of the functional units 130, 140. An ROB may therefore be provided for each of the functional units 130, 140. The ROBs therefore indicate instructions that have been issued for execution. Each entry is indexed by a unique identifier (UID), which is related to the program counter value of the instruction that generates the particular MOP. In addition, each entry is provided with a number of entries used in a Register Commit Queue (RCQ). The RCQ 410 provides an indicator of the outputs that are produced as a consequence of executing a micro-operation. Each entry provides a mapping between a logical register and a physical register. Consequently, when an instruction is encoded as performing an operation on a register r12, for instance, it is indicated as mapping to a physical register number 3. As previously discussed, a particular micro-operation may provide a number of different outputs and therefore a number of different entries may be provided for each micro-operation.

The register file 420 provides a complete set of physical registers. In the example shown in FIG. 3, the physical register number 132 stores the data value "bob". Note that at any one time only a subset of these physical registers in the register file 420 may be available to the processor. The Architectural Register Table (ART) represents physical registers in the register file 420 that contain outputs of instructions that have been committed. For instance, in the example in FIG. 3, the ART 430 indicates that physical register number 41 of the register file 420 relates to the output of a MOP whose corresponding instruction has been committed. Meanwhile, the Speculative Register Table (SRT) 440 represents those physical registers in the register file 420 that have been the subject of a MOP whose instruction has been speculatively executed. In this example, FIG. 3 illustrates that the value in physical register number 132 has been the subject of a speculative execution. It will be appreciated that the current state of execution of the data processing apparatus 100 can be thought of as being the combination of the ART entries 430 together with the SRT entries 440. These provide references to physical registers in the register file 420 whose data values have either been committed or have been speculatively executed. In practice, since the entries in the ART 430 have been committed, they cannot have been miss-speculated. Consequently, for the purposes of this disclosure, the current and previous states of the data processing apparatus 100 need not necessarily include contents of the ART 430.

The register file 420 provides a complete set of physical registers. In the example shown in FIG. 3, the physical register number 132 stores the data value "bob". Note that at any one time only a subset of these physical registers in the register file 420 may be available to the processor. The Architectural Register Table (ART) represents physical registers in the register file 420 that contain outputs of instructions that have been committed. For instance, in the example in FIG. 3, the ART 430 indicates that physical register number 41 of the register file 420 relates to the output of a MOP whose corresponding instruction has been committed. Meanwhile, the Speculative Register Table (SRT) 440 represents those physical registers in the register file 420 that have been the subject of a MOP whose instruction has been speculatively executed. In this example, FIG. 3 illustrates that the value in physical register number 132 has been the subject of a speculative execution. It will be appreciated that the current state of execution of the data processing apparatus 100 can be thought of as being the combination of the ART entries 430 together with the SRT entries 440. These provide references to physical registers in the register file 420 whose data values have either been committed or have been speculatively executed. In practice, since the entries in the ART 430 have been committed, they cannot have been miss-speculated. Consequently, for the purposes of this disclosure, the current and previous states of the data processing apparatus 100 need not necessarily include contents of the ART 430.

When miss-speculation occurs, the processor may not be able to simply erase the content of the SRT 440. This is because some of the speculatively executed instructions in the SRT 440 may have been correctly speculated if, for instance, miss-speculation occurs as a consequence of a later executed instruction. Consequently, on determining the UID of a micro-operation that caused miss-speculation, one can count up the number of RCQ entries listed in the ROB table 400 from the latest entry of the ROB table 400 to the point of miss-speculation, use this information to identify the physical registers of the RCQ table 410 that have been the subject of miss-speculation, and use that information to erase the relevant values of the SRT 440 and the corresponding register file 420. These changes must be combined with the current value of the ART 430. By copying the contents of the ART 430 to the SRT 440, it is possible to 'restart' from the committed state. Individual RCQ entries can then be copied from the oldest speculative entry to the point of the misprediction. This incrementally adds to the SRT 440 all speculative updates up until the flush point. In other embodiments, the ART 430 to SRT 440 copy can be avoided by undoing values of the SRT 440 from the youngest back to the miss-prediction point (rather than rebuilding forward from the committed state). In such embodiments, the RCQ entries would be the values replaced by each MOP instead of the values created by each MOP.

Figure 4:
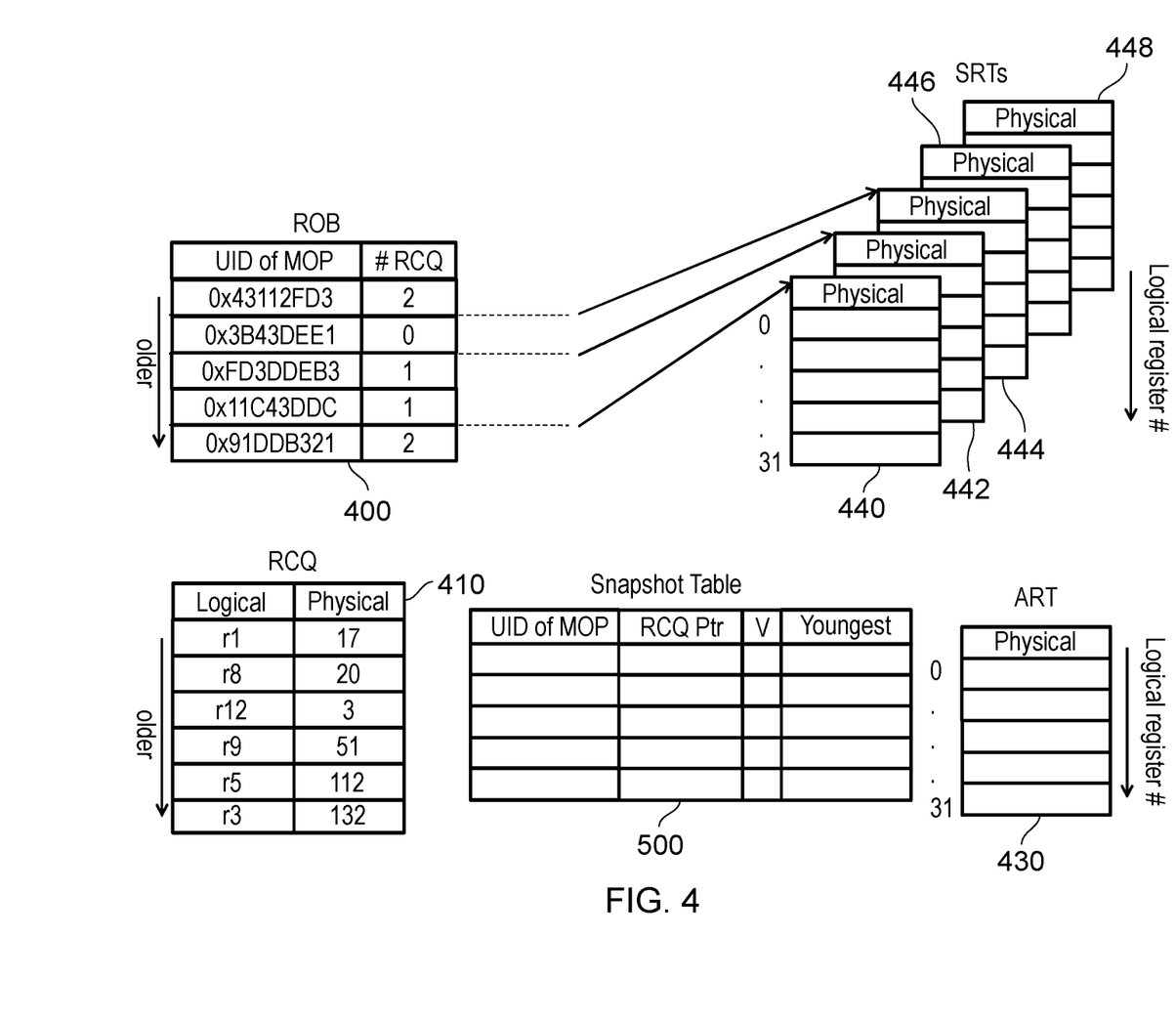
FIG. 4 illustrates a variant in which a number of SRTs are stored together with a snapshot table.

FIG. 4 illustrates a variant in which a number of SRTs 440, 442, 444, 446, 448 are stored together with a snapshot table 500. The ROB table 400, RCQ table 410 and ART 430 all remain as previously discussed. However, multiple SRTs 440, 442, 444, 446, 448 are provided, with one of the SRTs 440 corresponding with a "current state" and the others 442, 444, 446, 448 corresponding with previous states or "snapshots" taken at previous points in time. Accordingly, each of the SRTs 440, 442, 444, 446, 448 corresponds with a particular entry of the ROB table 400, which itself corresponds with a particular instruction such as a branch instruction as illustrated in FIG. 4. The relationship between an ROB table entry and the SRT tables 440, 442, 444, 446, 448 is stored in snapshot table 500. In particular, entries in the snapshot table 500 provide an association between a particular MOP UID, the RCQ pointer value (i.e. a pointer to a particular entry of the RCQ table 410 that corresponds with the end of the RCQ table at the point the corresponding MOP was issued), a validity entry, and a youngest-mask (for indicating the relative age of each entry of the snapshot table). When the snapshot generation circuitry 180 determines that a new snapshot is to be produced, a new entry is inserted into the snapshot table 500 indicating the UID of the MOP that is currently being executed.

When a rewind occurs, a snapshot near the point of miss-speculation can be used therefore reducing the need to perform numerous calculations in order to perform excessive rebuilding of the current SRT 440. Having identified the most appropriate SRT 440, 442, 444, 446, 448 to perform the rebuild from, a rebuild process occurs. The identified snapshot table is copied into the current SRT 440. Then, a subset of ROB/RCQ entries are examined (as previously discussed), in order to incrementally rebuild the current SRT from the Snapshot SRT state up to the micro-operation that represents the point of miss-prediction. This provides a list of micro-operations that have not yet been committed but may not have been miss-speculated and these are combined with a previous ART, which represents instructions that were correctly speculatively executed and committed.

Note that such a technique can also be used in an embodiment where a rewind occurs by undoing values of the SRT 440 from the youngest back to the miss-prediction point. This would reduce the extent to which a "backward" walk through the ROB 400/RCQ 410 entries was necessary.

Figure 5:
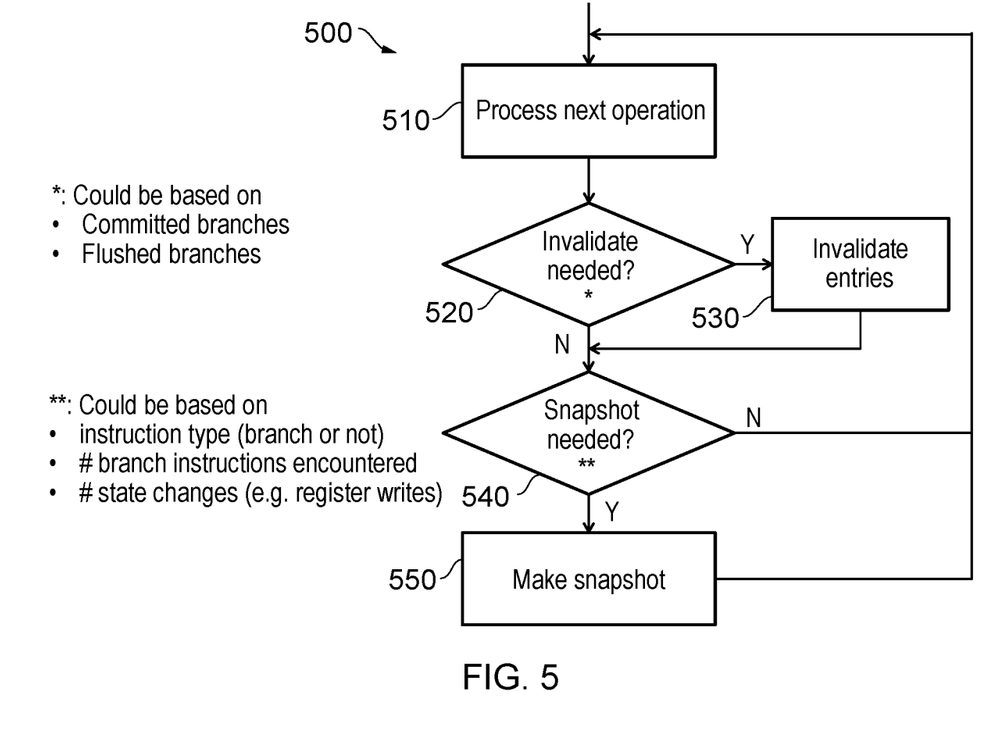
FIG. 5 illustrates a method of generating and flushing snapshots in accordance with some embodiments.

FIG. 5 illustrates a method of generating and flushing snapshots. The method is illustrated by a flow chart 500, which starts at a step 510 in which a micro-operation is issued. At a step 520, it is determined whether any of the current snapshots need to be invalidated (e.g. removed). This can occur as a consequence of a determination that a branch was miss-speculated, in which case a flush occurs. Consequently, having rebuilt the SRT 440 as previously discussed, the old SRT 440 and the corresponding entry in the snapshot table 500 are no longer necessary (e.g. because a flush has already occurred). Alternatively, if it is determined that a speculation has occurred correctly, then the speculatively executed instructions can be committed (i.e. transferred from the current SRT 440 to the ART 430). Accordingly, the corresponding SRT 440 will not be used since no rewind will occur that undoes this speculation. If any entries require invalidation, then at step 530, those entries are invalidated. This can be done as simply as marking the relevant entry of the snapshot table 500 as being invalid. In either case, at step 540 it is determined whether a further snapshot is needed. This determination can be based on, for instance, the instruction type, e.g. whether the micro-operation being executed corresponds with a branch instruction or not, the number of branch instructions that have been encountered since the last snapshot was generated, and/or the number of state changes that have taken place since the last snapshot was generated (e.g. the number of writes to registers that have taken place). If a snapshot is needed, then a snapshot is generated at step 550. In either case, the process returns to step 510 where the next operation is processed.

Figure 6:
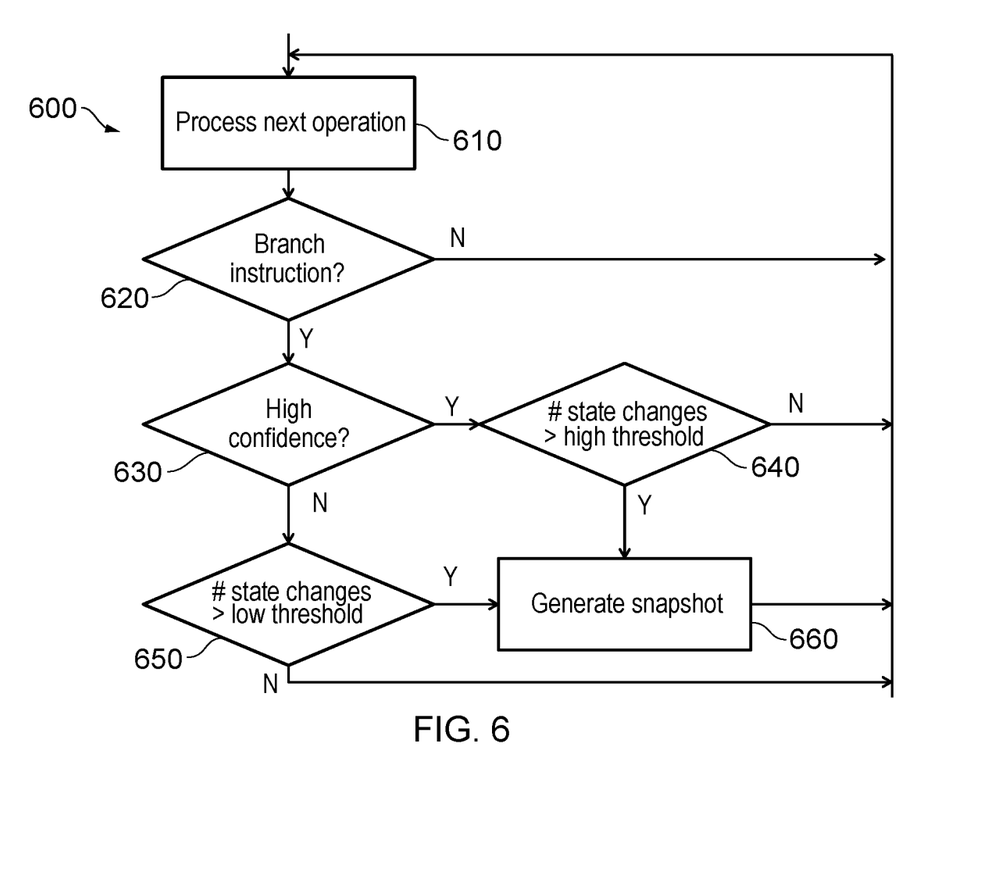
FIG. 6 illustrates a processor determining when a snapshot should be generated.

FIG. 6 illustrates a processor determining when a snapshot should be generated, e.g. by snapshot generation circuitry 180. This is shown in the form of flow chart 600 which begins at step 610 in which an operation is performed. At a step 620, it is determined whether the operation currently being processed relates to a branch instruction or not. Since miss-speculation typically occurs as a consequence of a branch instruction being incorrectly taken or not taken, it stands to reason that an appropriate point of rewind will be at branch instructions. Consequently, by determining whether or not the current operation relates to a branch instruction, it can be determined whether it is appropriate to generate a snapshot. At step 630, it is determined whether the branch instruction was taken or not taken with high confidence. If the confidence was high, then the number of state changes that have taken place since the last snapshot was generated is compared to a high threshold value at step 640. If the number of state changes is higher than the high threshold, then at step 660 a new snapshot is generated and the processor returns to step 610. If not, then the process simply returns to step 610. If at step 630 it is determined that the current micro-operation does not relate to a high confidence branch, then at step 650 it is determined whether the number of state changes that have occurred since the previous snapshot was generated is greater than a lower threshold. If so, then at step 660 the snapshot is generated and in either case the processor returns to step 610.

The above process is based on the realisation that it is appropriate to generate snapshots at branch instructions, since these are the most likely point of rewind. Accordingly, by generating snapshots at the branch instructions, it may be possible to create snapshots in which no or little further processing is required having selected the appropriate SRT for rewind. In any event, the process also recognises that where there is a high confidence branch prediction, it is less likely that a rewind will occur and therefore larger gap between snapshots are permitted. Conversely, if the prediction is low confidence, then it is more likely that a rewind will occur and so in an effort to reduce the amount of processing necessary, the gaps between snapshots will be reduced as represented by the use of the lower threshold value. Here, the high or low confidence can be indicated by the value associated with a saturated counter used to perform branch prediction. For instance, in a four-state branch prediction outcome, the minimum and maximum values (0 and 3 respectively) could represent the high confidence taken/not taken values while the values 1 and 2 may represent low confidence taken/not taken values.

Accordingly it can be appreciated that by use of the previously described technique it is possible to generate a number of snapshots that can minimise the amount of processing that must take place when a rewind occurs. Furthermore, by careful selection of the point of which the snapshots are generated, the amount of processing can be further reduced. By selecting the gap between such snapshots, it is also possible to select the snapshot points such that one might expect the amount of processing to be carried out to be low.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus, comprising:
processing circuitry to speculatively execute a plurality of instructions;
storage circuitry to store a current state of the processing circuitry and a plurality of previous states of the processing circuitry, wherein execution of the plurality of instructions changes the current state of the processing circuitry, and wherein the storage circuitry further comprises a register commit queue to store indicators of the changes to the current state of the processing circuitry;
flush circuitry to replace, in response to a miss-prediction, the current state of the processing circuitry with a replacement one of the plurality of previous states of the processing circuitry, wherein the flush circuitry is configured to incrementally update the replacement one of the plurality of previous states to a point of the miss-prediction based on a number of entries in the register commit queue;
snapshot generation circuitry to perform a determination as to whether the current state of the processing circuitry is to be stored in the storage circuitry; and
branch prediction circuitry to predict an outcome of a current instruction with a confidence indicator, wherein the determination comprises a requirement that the current instruction is a branch instruction;

the determination comprises a requirement that a number of state changes have been made since a most recent previous storage of the current state of the processing circuitry; and the number of state changes is dependent on the confidence indicator.

2. A data processing apparatus according to claim 1, wherein
a state of the processing circuitry comprises at least one reference to a result of one of the plurality of instructions that remains uncommitted.

3. A data processing apparatus according to claim 1, wherein
the determination comprises a requirement that n branch instructions have been encountered since a most recent previous storage of the current state of the processing circuitry.

4. A data processing apparatus according to claim 1, wherein
the number of state changes is a lower value when the confidence indicator indicates a lower value; and
the number of state changes is a higher value when the confidence indicator indicates a higher value.

5. A data processing apparatus according to claim 1, comprising:
invalidation circuitry to invalidate a flushed one of the plurality of previous states of the processing circuitry and to invalidate a completed one of the plurality of previous states.

6. A data processing apparatus according to claim 1, wherein
each of the previous states of the processing circuitry is associated with an age indicator to indicate its age relative to other previous states of the processing circuitry.

7. A data processing apparatus according to claim 6, wherein
the flush circuitry is adapted to select the replacement one of the plurality of previous states of the processing circuitry as a youngest one of the plurality of previous states occurring on or before a particular one of the plurality of instructions associated with the miss-prediction in the plurality of instructions.

8. A data processing apparatus according to claim 1, wherein
the plurality of previous states of the processing circuitry comprises 5 previous states of the processing circuitry.

9. A method comprising:
speculatively executing a plurality of instructions on processing circuitry;
storing a current state of the processing circuitry and a plurality of previous states of the processing circuitry, wherein execution of the plurality of instructions changes the current state of the processing circuitry;
storing indicators of the changes to the current state of the processing circuitry;
replacing, in response to a miss-prediction, the current state of the processing circuitry with a replacement one of the plurality of previous states of the processing circuitry;
updating incrementally the replacement one of the plurality of previous states to a point of the miss-prediction based on a number of entries in a register commit queue;
performing a determination as to whether the current state of the processing circuitry is to be stored in the storage circuitry; and
predicting an outcome of a current instruction with a confidence indicator, wherein
the determination comprises a requirement that the current instruction is a branch instruction;
the determination comprises a requirement that a number of state changes have been made since a most recent previous storage of the current state of the processing circuitry; and
the number of state changes is dependent on the confidence indicator.

* * * * *